United States Patent [19]
Sugiyama et al.

[11] Patent Number: 5,557,946
[45] Date of Patent: Sep. 24, 1996

[54] ABSORPTION TYPE HEAT PUMP

[75] Inventors: Takahide Sugiyama; Hisashi Takahashi; Nakahiro Inagaki, all of Shizuoka, Japan

[73] Assignee: Yazaki Corporation, Tokyo, Japan

[21] Appl. No.: 412,453

[22] Filed: Mar. 29, 1995

[30] Foreign Application Priority Data

Mar. 29, 1994 [JP] Japan .................................. 6-058782

[51] Int. Cl.$^6$ .......................... F25B 15/00; F25B 37/00
[52] U.S. Cl. ................................ 62/476; 62/494
[58] Field of Search .......................... 62/101, 476, 487, 62/486, 494

[56] References Cited

U.S. PATENT DOCUMENTS

| | | | |
|---|---|---|---|
| 2,532,179 | 11/1950 | Miller ....................................... | 62/476 |
| 4,193,268 | 3/1980 | Phillips ..................................... | 62/101 |
| 5,024,063 | 6/1991 | Erickson ................................... | 62/101 |
| 5,033,274 | 7/1991 | Erickson ................................... | 62/476 |
| 5,271,235 | 12/1993 | Phillips et al. ........................... | 62/101 |
| 5,325,684 | 7/1994 | Stierlin et al. ............................ | 62/487 |

*Primary Examiner*—William Doerrler
*Attorney, Agent, or Firm*—Sughrue, Mion, Zinn, Macpeak & Seas

[57] ABSTRACT

An invert rectifier is provided in which: cooling medium vapor sent from the evaporator is contacted with a weak solution sent from the regeneration unit, and the temperature of cooling medium vapor and the vapor component of absorbent are increased by the action of invert rectification, so that the enthalpy of cooling medium vapor supplied to the vapor-liquid mixer is enhanced. In this invert rectifier, cooling medium vapor is introduced to a lower portion of the container and a residual portion of the weak solution or all weak solution is introduced to an upper portion of the vapor-liquid mixer 16, so that the introduced cooling medium vapor and weak solution are subjected to vapor-liquid contact by the action of an opposed flow. Due to the foregoing, cooling medium vapor is generated, the temperature of which is high, and the amount of the vapor component of absorbent of which is large, so that the enthalpy of cooling medium vapor is enhanced. Even when the thus obtained cooling medium vapor is mixed with a weak solution in the vapor-liquid mixer 16, the temperature is seldom lowered in the mixing process, and an amount of heat exchange in the absorption regeneration heat exchanging section is increased, and the result coefficient is enhanced.

26 Claims, 6 Drawing Sheets

5,557,946

ABSORPTION TYPE HEAT PUMP

BACKGROUND OF THE INVENTION

1. Field of the Invention

The present invention relates to an absorption type heat pump, and more particularly relates to an absorption type heat pump of the GAX (Generator-Absorber Heat Exchanger) cycle in which heat of absorption is used for input heat necessary for regeneration of a strong solution.

2. Related Art

The GAX cycle is well known as a technique for enhancing the efficiency of an absorption type refrigerating cycle in which ammonia is used as a cooling medium and water is used as an absorbent. (For example, the technique is disclosed in the documents "A new future for absorption" of ASHRAE JOURNAL November 1986 B. A. Philips).

FIG. 9 shows an example of the GAX cycle of an absorbent liquid shown in the above documents. In the drawing, the process from state $F_1$ to state C is an absorption process, and the process from state $D_1$ to state $E_1$ is a regeneration process.

In the absorption process, water, which is an absorbent, absorbs ammonia vapor, which is a cooling medium, so that a solution in which the cooling medium concentration is high, is provided (condition C). This solution, in which the cooling medium concentration is high, is referred to as a strong solution, hereinafter. Pressure of the strong solution in state C is boosted, and the strong solution is heated when heat is exchanged with the absorption heat generated in the absorption process. In this way, the strong solution is put into a boiling condition and the regeneration process starts (state $D_1$). In the regeneration process, vapor of the strong solution is boiled and condensed by the heat exchange with absorption heat in the same manner, so that the vapor of the strong solution is put into a state $D_2$. After that, the strong solution is given heat from the outside of the system by the regeneration heat input device. Therefore, the solution is put into a state $E_1$ of an ammonia water solution of low concentration and high temperature. This ammonia water solution is referred to as a weak solution.

Since the temperature of this weak solution is high, heat of the weak solution is discharged by the heat exchange so that the discharged heat can be used as a portion of the heat necessary for the regeneration process. While the heat is discharged, the solution is put into an over-cooling condition $E_2$. Then the pressure is reduced by a pressure reducing valve, so that the solution is put into a state $F_1$. In this way, the absorption process starts.

The absorption process is defined as a process in which a cooling medium is absorbed by a weak solution of state $F_1$ so as to generate a strong solution of state C. Absorption heat generated in this absorption process is recovered so as to be used as a portion of heat for regenerating the strong solution generated in the absorption process. Due to the foregoing, the weak solution of state $F_t$ becomes a strong solution of state C, the ammonia concentration of which is increased. Pressure of the strong solution of state C is boosted up again by the solution pump 16, and the above circulation is repeated.

The most important thing to enhance the thermal efficiency in this GAX cycle is to recover absorption heat in the absorption process as much as possible so that the recovered heat can be used for regeneration. In order to attain the above object, it is necessary to provide a wide range of concentration of the solution so as to extend an overlapping portion of the temperature increase in the process of regeneration and the temperature decrease in the process of absorption. In other words, in FIG. 9, it is necessary to extend a temperature difference between states $D_1$ and $F_1$, and to reduce a temperature difference between states $D_1$ and $F_2$.

State $D_1$ depends on a temperature of the external cooling fluid for cooling the solution in the absorption process, and state $F_1$ depends on a limiting line in the ammonia concentration diagram. When the ammonia concentration is 2 to 3% this limiting line is provided That is, a temperature difference between states $D_1$ and $F_1$ is approximately determined. Therefore, it is important to reduce the temperature of state $F_2$. In order to reduce the temperature of state $F_2$, it is necessary to enhance the performance of the heat exchanger engaging with absorption and regeneration.

SUMMARY OF THE INVENTION

It is an object of the present invention to enhance a ratio of utilization of absorption heat so that the absorption heat can be used for regeneration in a GAX cycle absorption type heat pump. That is, it is an object of the present invention to enhance the result coefficient of a GAX cycle absorption type heat pump.

In order to solve the above problems and operate the AX cycle effectively, the present invention is to provide an absorption type heat pump comprising:

a regenerating device unit having a dephlegmator and a rectifier arranged below the dephlegmator, the regenerating unit heating a solution in the bottom by an external heating means, so that a cooling medium is vaporized;

a condenser connected with the regenerating device unit through a high pressure cooling medium vapor conduit, the condenser condensing and liquidizing cooling medium vapor introduced from the regenerating device unit;

a cooling medium heat exchanger connected with the condenser through a cooling medium conduit, the cooling medium heat exchanger cooling the condensed and liquidized cooling medium;

a cooling medium expansion valve for decompressing the liquidized cooling medium cooled by the cooling medium heat exchanger;

an evaporator for evaporating the liquid cooling medium decompressed by the cooling medium expansion valve on the external surface of an evaporating coil, so that the external cooling medium in the evaporating coil is cooled and supplied to a thermal load to be cooled;

a low pressure cooling medium vapor conduit for guiding the cooling medium vapor generated in the evaporator to an absorption unit through a heated fluid side of the cooling medium heat exchanger;

a solution pump connected with a bottom of the absorbing device unit, the solution pump compressing a strong solution stored in the bottom so as to feed the strong solution to a strong solution heat: exchanger arranged in the absorbing device unit;

a strong solution scattering means for scattering a strong solution that has passed through a strong solution heat exchanger, the strong solution scattering means being arranged in the regenerating device unit;

a weak solution heat exchanger arranged below the strong solution scattering means of the regenerating device unit, the weak solution heat exchanger reducing a temperature of the weak solution when the weak solution in the bottom of the regenerating device unit passes through the weak solution heat exchanger for heat exchange with the strong solution;

a weak solution introducing means for supplying a weak solution that has passed through the weak solution heat exchanger to the absorbing device unit through a weak solution pressure reducing valve; and an absorbing radiator arranged in the absorbing device unit, the absorbing radiator removing the absorption heat generated when the strong solution is produced when the weak solution supplied by the weak solution introducing means absorbs the cooling medium vapor supplied through the low pressure cooling medium vapor conduit, wherein ammonia is used as a cooling medium and water is used as an absorbent, a vapor-liquid mixer is connected onto a downstream side of the weak solution pressure reducing valve, a downstream end of the low pressure cooling medium vapor conduit is connected with another entrance of the vapor-liquid mixer, a pipe line forming the absorption regenerating device through which a mixed current of two phases of vapor-liquid passes is arranged under the strong solution scattering means of the regenerating device unit, and an inlet of the pipe line is connected with an outlet of the vapor-liquid mixer, and an outlet of the pipe line is connected with the absorbing device unit through a conduit of the two phase current. In this case, various types of absorption regenerating devices can be employed, that is, a type in which the pipe line of a mixed current is formed into a spiral pipe may be employed, and also a type in which the pipe line of a mixed current is formed to be vertical may be employed.

The above object can be also accomplished by the absorption type heat pump, the absorption type heat pump further comprising a gas-vapor separation solution scattering device for separating a mixed current into gas and liquid, the mixed current being composed of a weak solution and cooling medium vapor supplied by the two phase current conduit, the gas-vapor separation solution scattering device scattering the separate liquid downward, the gas-vapor separation solution scattering device being arranged at an upper position of the strong solution heat exchanger installed in the absorbing device unit, the gas-vapor separation solution scattering device being connected with the two phase current conduit.

The above object can be accomplished by the absorption type heat pump, wherein a cooling medium vapor heater having a pipe line in which cooling medium vapor passes is arranged at a position where the solution drips from the external surface of the strong solution heat exchanger and this position is located in the middle between the strong solution heat exchanger provided in the absorption device unit and the absorption radiator with respect to the upward and downward direction, and an inlet of cooling medium vapor of the cooling medium vapor heater is connected with an outlet of heated fluid of the cooling medium heat exchanger, and an outlet of cooling medium vapor is connected with an inlet of cooling medium vapor of the vapor-liquid mixer.

The above object can be also accomplished by the absorption type heat pump, wherein a cooling medium vapor heater having a pipe line in which cooling medium vapor passes is arranged at a position where the solution drips from the external surface of the dephlegmator and the position is located in the middle between the dephlegmator provided in the regenerating device unit and the rectifier with respect to the upward and downward direction, and an inlet of cooling medium vapor of the cooling medium vapor heater is connected with an outlet of heated fluid of the cooling medium heat exchanger, and an outlet of cooling medium vapor is connected with an inlet of cooling medium vapor of the vapor-liquid mixer.

The above object can be also accomplished by the absorption type heat pump, wherein a ribbon-shaped baffle plate twisted around the axial line is fixed inside of the pipe line composing the absorption regenerating device.

In order to solve the above problems, the solving means of the present invention is to provide an invert rectifier characterized in that: cooling medium vapor flowing out from an evaporator is contacted with a weak solution flowing out from a regeneration unit; the temperature of cooling medium vapor is raised by the action of invert rectification; and an absorbent component in the cooling medium vapor is increased, so that the enthalpy of cooling medium vapor supplied to a vapor-liquid mixer is enhanced. In this invert rectifier, cooling medium vapor flowing out from the evaporator is introduced into a lower portion of the container, and a portion of the weak solution introduced from the regeneration unit into the vapor-liquid mixer is introduced into an upper portion, so that the cooling medium steam and weak solution are subjected to vapor-liquid contact by the action of a counter flow. Then the generated cooling medium steam is supplied to the vapor-liquid mixer from the top of the invert rectifier. Also, an intermediate weak solution generated at the bottom of the invert rectifier is supplied to either a first solution scattering device provided at the top of the absorption unit or a second solution scattering device provided above the absorption radiating section of the absorption unit.

In the absorption regenerating device of the present invention, the cooling medium vapor and weak solution flow in the pipe line from the lower to the upper portion forming a two phase current. While the cooling medium vapor and weak solution are flowing in the pipe line, the cooling medium vapor is absorbed by the weak solution. Absorption heat generated in the process of absorption is transmitted to the strong solution flowing down on an external surface of the pipe line, and the strong solution uses the transmitted heat for regeneration. Due to the regeneration heat, the cooling medium is emitted from the strong solution. In a conventional apparatus, in the absorption regenerating device heat recovery section, absorption heat is temporarily recovered by the heating medium, and then in the absorption regenerating device radiating section, heat is transmitted to the strong solution as evaporation heat. Therefore, it is necessary to exchange heat by two steps in the construction of the prior art. However, in the construction of the present invention, absorption heat is converted into evaporation heat by one step. Accordingly, a difference between the average temperature on the heat receiving side and that on the heat source side can be reduced, and an amount of recovered heat is increased.

Units installed in the regenerating device unit are arranged in such a manner that the solution successively drips from the uppermost dephlegmator to the surface of the lower unit. Accordingly, the weak solution on the bottom portion is rectified by the solution flowing downward on the units, and also the cooling medium vapor generated on the surfaces of the lower units is rectified by the solution flowing downward while it rises upward, so that the concentration of ammonia is increased. For this reason, a rectifier of low performance, for example, a simple apparatus in which the Raschig ring filling layer is used can be employed for the regenerating device unit.

Before low pressure cooling medium vapor is mixed with the weak solution, it is heated by the cooling medium vapor heater installed in the regenerating device unit or the absorbing device unit, and then the cooling medium vapor is subjected to absorbing operation. Due to the foregoing, the temperature level of absorption heat can be raised, and the recovery efficiency of absorption heat can be enhanced.

In the absorption regenerating device, the strong solution flowing down on the external surface takes the absorption heat generated inside and boils away, and at the same time the concentration of ammonia is lowered and the temperature is raised. On the other hand, the weak solution and vapor are introduced into the absorption regenerating device from below, so that a two phase current of the weak solution and vapor flows upward. While the current is flowing upward, the weak solution absorbs vapor, and the generated heat is given to the solution on the external surface, and the concentration of ammonia is increased by the weak solution itself and the temperature is lowered. As described above, counter current heat exchange is carried out inside and outside of the absorption regenerating device.

In the regenerating device unit, there are provided a dephlegmator, rectifier, absorption regenerating device, weak solution heat exchanger and regenerating device, and these units are arranged from above to below in series.

On the surface of the dephlegmator, a portion of vapor is condensed, and vapor is boiling on the surfaces of the absorption regenerating device, weak solution heat exchanger and regenerating device.

Circulating liquid that has condensed on the surface of the dephlegmator flows down to the absorption regenerating device through the rectifier located at the lower position. Then the circulating liquid is mixed with the strong solution scattered by the strong solution scattering means in the upper portion of the absorption regenerating device. Then the mixed solution flows down on the surfaces of the absorption regenerating device and the weak solution heat exchanger. While the solution is flowing down from the upper to the lower heat exchanger, cooling medium vapor is generated, so that the concentration of ammonia is lowered and the temperature is raised.

Cooling medium vapor is generated in the regenerating heat input device, weak solution heat exchanger and absorption regenerating device, and the temperature of vapor is raised and the concentration of ammonia is lowered in this order. In the respective heat exchanger, the temperature is distributed from the upper to the lower portion, and the concentration is also distributed from the upper to the lower portion. Vapor generated in the lower heat exchanger successively passes through the upper heat exchangers. In this process, vapor comes into counterflow-contact with the solution flowing down on the surface of the heat exchanger, so that vapor is subjected to rectifying action, and the concentration of ammonia is gradually increased and the temperature is lowered. In order to improve the material exchange between vapor and liquid in each heat exchanger, it is effective to use fin tubes by which the contact area can be extended.

According to the solving means of the present invention, the above problems are solved by the following mode of operation.

Cooling medium vapor of low temperature and high purity is introduced into a lower portion of the invert rectifier and ascends inside it. On the contrary, a portion of the weak solution of high temperature supplied from the regeneration unit is introduced into an upper portion of the invert rectifier and descends inside it. In this process, the cooling medium vapor and weak solution are subjected to vapor-liquid contact by the action of a counter flow, so that material exchange is conducted between the two.

Due to the above material exchange, cooling medium vapor of high temperature, the absorbent component (steam) of which is high, is generated at an upper portion of the invert rectifier. Therefore, the enthalpy of cooling medium vapor is greatly increased. Since the cooling medium vapor of high enthalpy is supplied to the vapor-liquid mixer, even when the cooling medium vapor is mixed with the weak solution by the vapor-liquid mixer, the temperature is seldom lowered. Accordingly, the temperature of a mixed fluid, which is a heating fluid of the absorption regeneration heat exchanging section of the regeneration unit, can be maintained high. Therefore, an amount of heat exchange is increased and the result coefficient can be enhanced.

On the other hand, the solution introduced into the invert rectifier is subjected to vapor-liquid contact with cooling medium vapor, so that its temperature is lowered and the solution becomes an intermediate weak solution, the cooling medium concentration of which is high. This intermediate weak solution is supplied to the first solution scattering device arranged on the strong solution heat exchanging section of the absorption unit, or alternatively supplied to the second solution scattering device arranged on the absorption radiator, so that the intermediate weak solution is used for absorption treatment. It is a matter of designing to determine to which solution scattering device the intermediate weak solution is supplied. When the temperature and concentration of the intermediate weak solution obtained in the invert rectifier are approximately the same as the temperature and concentration of the weak solution supplied to the first solution scattering device arranged on the strong solution heat exchanging section of the absorption unit, the intermediate weak solution is supplied to the scattering device. In this case, it is not necessary to provide the second solution scattering device on the absorption radiator. When the temperature and concentration of the intermediate weak solution are lower than the temperature and concentration of the weak solution supplied to the solution scattering device arranged on the strong solution heat exchanging section, the intermediate weak solution is supplied to the second solution scattering device arranged on the absorption radiator.

In this connection, the temperature and concentration of the intermediate weak solution obtained by the invert rectifier vary in accordance with performance of the invert rectifier and a ratio (ratio of divided flows) of an amount of the weak solution introduced into the vapor-liquid mixer to an amount of the weak solution introduced into the invert rectifier. In this case, the ratio of divided flows is defined as follows.

{(Amount of flow of weak solution introduced into the invert rectifier)/(Amount of flow of weak solution)} × 100%

Then the ratio of divided flows can be arbitrarily set to be a value from 0% to 100%. The ratio of divided flows is determined in the process of designing the apparatus. The ratio of divided flows is determined to be approximately in a range from 20% to 100%. Depending on a case, the ratio of divided flows may be determined to be 100%. In this case, the vapor-liquid mixer is eliminated and only vapor is introduced into the inside passage of the absorption regeneration heat exchanging section. Therefore, the introduced vapor is condensed and liquidized in the passage by the heat exchange conducted between the vapor and the solution which flows down on an outer surface of the absorption regeneration heat exchanging section.

In this case, in order to enhance the effect of invert rectification provided by vapor-liquid contact in the invert rectifier, it is preferable to provide a plurality of rectifying shelves inside the invert rectifier, wherein the plurality of rectifying shelves are arranged in multiple steps. The rectifying shelves are composed in such a manner that a predetermined amount of solution stays on the shelves and a surplus amount of solution overflows onto the lower steps. For example, the rectifying shelves are composed in the following manner:

A plurality of holes are formed in a flat plate. Protruding portions are formed around the holes, so that a predetermined amount of solution stays on the shelves, and an amount of solution that has overflowed the protruding portions flows downward onto the lower shelves.

Instead of the rectifying shelves, it is possible to apply a filling layer in which a filling material, the surface area per unit volume of which is large, is used.

DETAILED DESCRIPTION OF THE PREFERRED EMBODIMENTS

Figure 1:
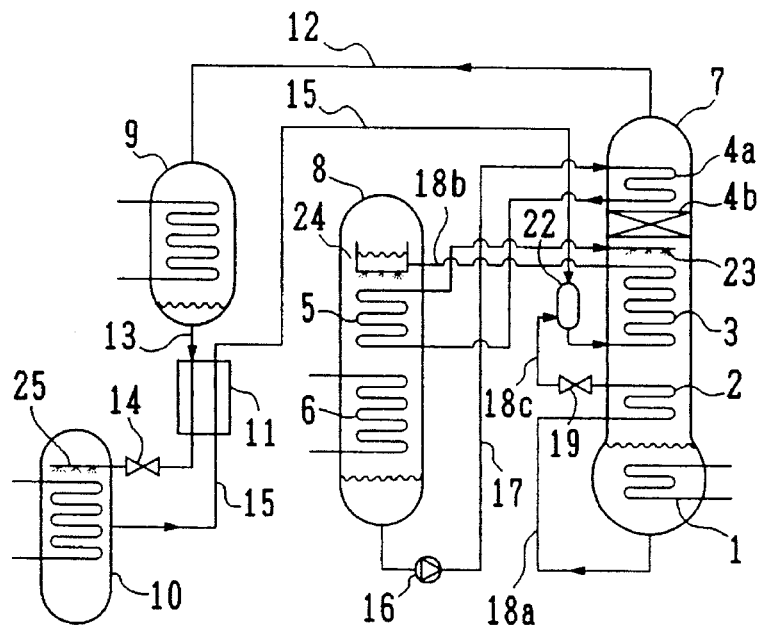
FIG. 1 is a system diagram showing a structure of the primary portion of the first example of the absorption type heat pump according to the present invention.
Figure 2:
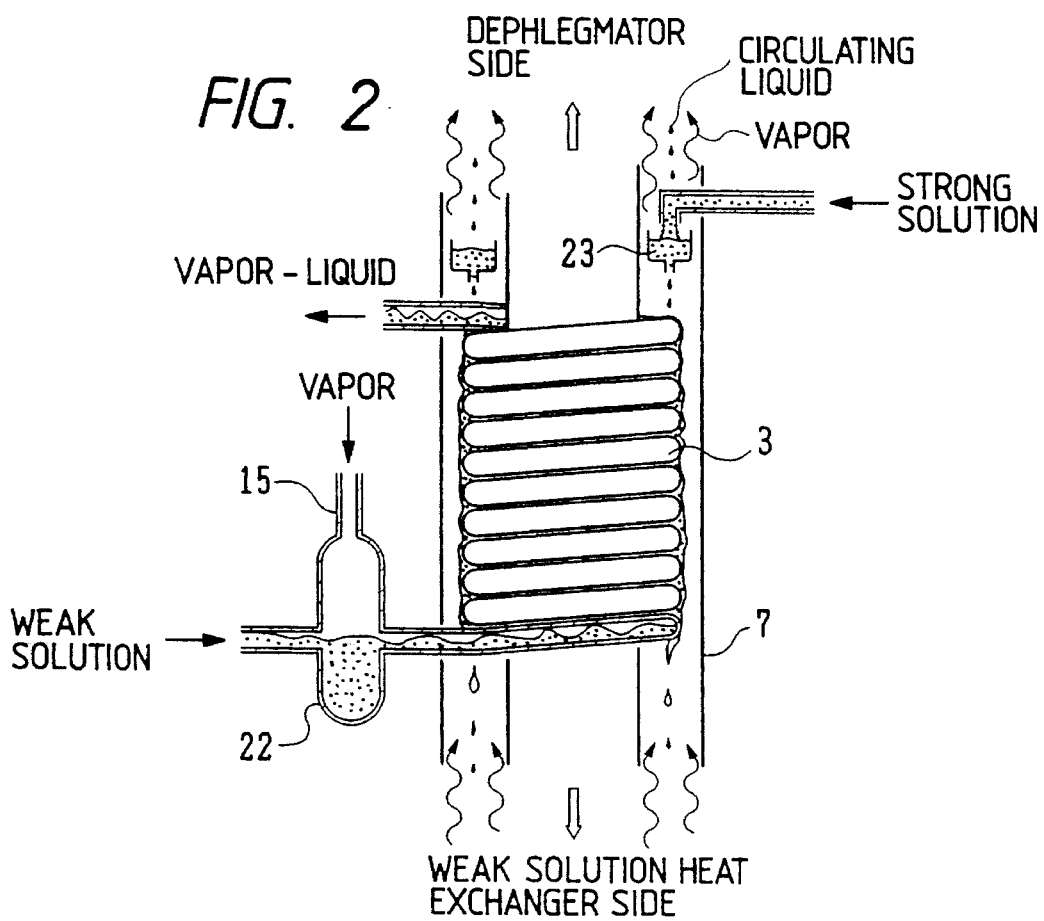
FIG. 2 is a sectional schematic illustration showing a model of the absorption regenerating device shown in FIG. 1.

With reference to the examples shown in the drawings, the present invention will be explained as follows.
First embodiment With reference to FIG. 1, the first example of the present invention will be explained as follows. In the absorption type heat pump illustrated in the drawing, ammonia is used as a cooling medium and water is used as an absorbent. The absorption type heat pump includes: a regenerating device unit 7 for generating and feeding cooling medium vapor; condenser 9, which is a shell tube type heat exchanger, the barrel side of which is connected with the regenerating device unit 7 through a high pressure cooling medium vapor conduit 12; cooling medium heat exchanger 11, the heating medium inlet of which is connected with the outlet on the barrel side of the condenser 9 through a cooling medium liquid conduit 13; evaporator 10, the cooling medium scattering device of which is connected with the heating medium outlet of the cooling medium heat exchanger 11 through an expansion valve 14; low pressure cooling medium vapor conduit 15 for connecting the outlet on the barrel side of the evaporator 10 with the inlet of fluid to be heated of the cooling medium heat exchanger 11; vapor-liquid mixer 22, the cooling medium vapor of which is connected with the outlet of fluid to be heated of the cooling medium heat exchanger 11 through the low pressure cooling medium vapor conduit 15; absorption regenerating device 3 composed of a spiral-coil-shaped pipe line, the absorption regenerating device 3 being arranged in the regenerating device unit 7, the inlet of the absorption regenerating device 3 being connected with the outlet of the vapor-liquid mixer 22; vapor-liquid separation solution scattering device 24 arranged in the absorption device unit 8, the vapor-liquid separation solution scattering device 24 being connected with the outlet of the absorption regenerating unit 3 through a two phase current conduit 18B; solution pump 16, the suction side of which is connected with a bottom of the absorbing device unit 8; dephlegmator 4A arranged in the regenerating unit 7, the inlet of the dephlegmator 4A being connected with the outlet of the solution pump 16 through a strong solution conduit 17; strong solution heat exchanger 5 arranged in the absorbing device unit 7, the inlet of the strong solution heat exchanger 5 being connected with the outlet of the dephlegmator 4A; strong solution scattering device 23 arranged in the regenerating device unit 7, the inlet of the strong solution scattering device 23 being connected with the outlet of the strong solution heat exchanger 5; weak solution heat exchanger 2 arranged in the regenerating device unit 7, the inlet of the weak solution heat exchanger 2 being connected with a bottom of the regenerating unit 7 through a weak solution conduit 18A; weak solution pressure reducing valve 19 arranged on a conduit connecting the outlet of the weak solution heat exchanger 2 with the weak solution inlet of the vapor-liquid mixer 22; rectifier 4B arranged in the regenerating device unit 7; regenerating heat input device 1 arranged in the regenerating device unit 7; absorption radiator arranged in the absorbing device unit 8; and evaporating coil 10A arranged in the evaporator 10, a medium to be cooled being circulated in the evaporating coil 10A. FIG. 2 is a schematic illustration showing the section of the absorption regenerating device 3 composed of a spiral-coil-shaped pipe line, the axis of which is arranged in the upward and downward direction.

The cooling medium scattering device 25 is arranged in such a manner that a solution is scattered on the external surface of the evaporating coil 10A. The vapor-liquid separating solution scattering device 24, strong solution heat exchanger 5 and absorption radiator 6 provided in the absorbing device unit 8 are arranged in such a manner that a solution scattered by the vapor-liquid separating solution scattering device 24 successively flows down from the external surface of the strong solution heat exchanger 5 onto the external surface of the absorption radiator 6.

The strong solution scattering device 23, absorption regenerating device 3 and weak solution heat exchanger 2 provided in the regenerating device unit 7 are arranged in such a manner that a solution scattered by the strong solution scattering device 23 successively flows down from the external surface of the absorption regenerating device 3 onto the external surface of the weak solution heat exchanger 2. The regenerating heat input device 1 is arranged in the lowermost portion of the regenerating unit 7, the rectifier 4B is arranged above the strong solution scattering device 23, and the dephlegmator 4A is arranged above the rectifier 4B.

Next, operation of the apparatus of the above construction will be explained as follows. An aqueous ammonia solution is cooled by the absorption radiator 6 so that it completely absorbs cooling medium vapor and becomes a strong solution. The thus obtained ammonia solution is temporarily stored in the bottom portion of the absorbing device unit 8. Pressure of the stored solution is boosted up the solution pump 16, and the strong solution is fed into the dephlegmator 4A provided in the regenerating device unit 7 through the strong solution conduit 17. Due to the strong solution flowing in the dephlegmator 4A, a portion of cooling medium vapor in the regenerating device unit 7 is condensed on the external surface of the dephlegmator 4A. The strong solution receives the condensation heat at this time, so that the temperature of the strong solution is a little raised, and then the strong solution is returned to the absorbing device unit 8 and introduced into the strong solution heat exchanger 5 provided in the absorbing unit 8. On the external surface of the strong solution heat exchanger 5, cooling medium vapor is absorbed by the solution dripping from the vapor-liquid separating solution scattering device 24. The strong solution flowing in the strong solution heat exchanger 5 takes the absorption heat, so that the temperature of the strong solution is raised from an overcool state to a saturation state. The strong solution of which the temperature has been raised is introduced into the strong solution scattering device 23 provided in the regenerating unit 7 and dripped onto the external surface of the absorption regenerating device 3. In the absorption regenerating device 3, while a two phase current of the weak solution and cooling medium vapor fed from the vapor-liquid mixer 22 is rising, cooling medium vapor is absorbed by the weak solution, and the strong solution dripped onto the external surface is heated by the absorption heat, so that cooling medium vapor is generated. When cooling medium vapor (ammonia vapor) is generated, the concentration of the strong solution is lowered as it comes downward, and the temperature is raised.

The strong solution flowing down on the external surface of the absorption regenerating device 3 boils and comes into contact with ammonia vapor of high temperature and high humidity at the same time. Therefore, the strong solution conducts rectifying operation of material exchange in such a manner that the strong solution absorbs moisture and discharges ammonia. Therefore, the composition of ammonia vapor rising along the external surface of the absorption regenerating device 3 becomes close to an equilibrium composition of the strong solution. The cooling medium condensed on the external surface of the dephlegmator 4A becomes a circulating liquid and gets into the rectifier 4B. In the rectifier 4B, the cooling medium comes into contact with cooling medium vapor rising on the external surface of the absorption regenerating device 3, so that the concentration of ammonia is reduced and the cooling medium drops onto an upper portion of the absorption regenerating device 3.

Then the cooling medium is mixed with the strong solution dripping from the strong solution scattering device 23 and flows on the external surface of the absorption regenerating device 3, and cooling medium vapor is evaporated and the concentration of ammonia is reduced. On the other hand, cooling medium vapor rising outside of the absorption regenerating device 3 gets into the rectifier 4B and comes into contact with the circulating liquid, so that cooling medium vapor is rectified and passes through outside of the dephlegmator 4A.

The solution flowing down along the external surface of the absorption regenerating device 3 finally drips onto the external surface of the weak solution heat exchanger 2. The solution that has dripped onto the external surface of the weak solution heat exchanger 2 takes heat from a weak solution of high temperature flowing inside of the weak solution heat exchanger 2, and ammonia vapor is generated and the concentration of ammonia is further reduced. In the same manner as that of the external surface of the absorption regenerating device 3, on the external surface of the weak solution heat exchanger 2, material exchange is conducted between the cooling medium vapor (ammonia vapor) generated by the regenerating heat input device 1 and the solution, so that the rectifying action is conducted on the cooling medium vapor.

After the solution has passed through on the external surface of the weak solution heat exchanger 2, it drops to the bottom of the rectifying unit 7. The solution is stored in the bottom portion of the rectifying unit 7. Then the solution is given heat such as combustion heat by the regenerating heat input device 1 attached to the bottom portion. Since the solution is heated by the regenerating heat input device 1, it boils so that the temperature is raised to the highest value and the concentration of ammonia becomes the lowest value. Generated vapor of high temperature passes through on the external surfaces of the weak solution heat exchanger 2, absorption regenerating device 3, rectifier 4B and dephlegmator 4A. While generated vapor passes through on the external surfaces of the above units, the temperature is lowered and the concentration of ammonia is increased. Then the concentration of ammonia is increased to a value sufficiently high to exhibit the refrigerating capacity, and vapor is discharged from the regenerating unit 7. After vapor has been discharged from the regenerating unit 7, it is introduced into the condenser 9 through the high pressure cooling medium vapor conduit 12.

On the other hand, in the bottom portion of the regenerating unit 7, ammonia vapor has evaporated from the aqueous ammonia solution. Therefore, the temperature of the aqueous ammonia solution is raised and the concentration is lowered. The thus obtained ammonia solution (weak solution) is introduced from a lower portion of the regenerating unit 7 into the weak solution heat exchanger 2 through the weak solution conduit 18A. Therefore, the aqueous ammonia solution gives heat to a solution boiling on the external surface of the weak solution heat exchanger 2, and the temperature of the aqueous ammonia solution itself is lowered. After the weak solution has passed through the weak solution heat exchanger 2, it is put in an overcool state. Pressure of this weak solution is reduced by the pressure reducing valve 19. Then the weak solution gets into the gas-vapor mixer 22. The weak solution that has gotten into the vapor-liquid mixer 22 is joined with low pressure cooling medium vapor that has generated in the evaporator 10 and passed through the cooling medium heat exchanger 11 and been introduced into the vapor-liquid mixer 22 through the low pressure cooling medium vapor conduit 15.

Then the weak solution and cooling medium vapor in the vapor-liquid mixture phase flow into the absorption regenerating device 3. The weak solution and low pressure cooling medium vapor that have flowed into the absorption regenerating device 3 flow from the lower portion to the upper portion as a vapor-liquid two phase current. A portion of the cooling medium vapor is absorbed by the weak solution, so that heat is generated. Thus generated heat is given to a strong solution flowing down on the external surface of the absorption regenerating device 3. Therefore, the strong solution is boiled by the heat. The weak solution flowing in the absorption regenerating device 3 absorbs cooling medium vapor that has flowed into the device together, so that the concentration of ammonia of the weak solution is increased. However, the weak solution is cooled by the strong solution flowing on the external surface, and the temperature is lowered.

The weak solution, the ammonia concentration of which is increased while it flows in the absorption regenerating device 3, passes through the two phase current conduit 18B and is introduced into the vapor-liquid separating solution scattering device 24 provided in the absorbing device unit 8. Cooling medium vapor that has not been absorbed by the weak solution is separate here from the weak solution, and the weak solution is dripped from the vapor-liquid separating solution scattering device 24 onto the external surface of the strong solution heat exchanger 5. The dripped solution is cooled by the strong solution flowing in the strong solution heat exchanger 5, so that the absorbing capacity is increased. While the weak solution, the absorbing capacity of which has been increased, flows down on the external surface of the strong solution heat exchanger 5, the weak solution starts absorbing cooling medium vapor that has been separated by the vapor-liquid separating solution scattering device 24. The weak solution that has absorbed cooling medium vapor so that the ammonia concentration has been raised passes on the external surface of the strong solution heat exchanger 5. Then the weak solution is dripped onto the external surface of the absorbing radiator 6. In the absorbing radiator 6, an external cooling medium such as cooling water flows. Therefore, the solution that has dripped onto the external surface is further cooled to a lower temperature. The solution absorbs cooling medium vapor here and becomes a strong solution. The thus obtained strong solution is stored in the bottom portion of the absorbing unit 8. As described above, cooling medium vapor that has been separated by the vapor-liquid separating solution scattering device 24 is entirely absorbed by the weak solution while the weak solution flows down on the external surfaces of the strong solution heat exchanger 5 and the absorbing radiator 6. Pressure of the strong solution stored in the bottom portion of the absorbing unit 8 is boosted up by the solution pump 16, and the above operation cycle is repeated.

A portion of the cooling medium vapor generated in the regenerating device unit 7 is condensed by the dephlegmator 4A, wherein the cooling medium vapor has been generated in the process of heating in the regenerating heat input device 1, in the absorption regenerating device 3, and in the strong solution heat exchanger. However, the residual cooling medium vapor is introduced into the condenser 9 through the high pressure cooling medium vapor conduit 12 as described before. After the cooling medium vapor has been introduced into the condenser 9, it is cooled by an external cooling medium such as cooling water, and condensed and liquidized. The liquidized cooling medium stored in the bottom portion of the condenser 9 is introduced onto the heating fluid side of the cooling medium heat exchanger 11 through the cooling medium liquid conduit 13. The liquid cooling medium introduced onto the heating fluid side of the cooling medium heat exchanger 11 is cooled by the low pressure cooling medium vapor that has been generated in the evaporator 10 and introduced onto the side of fluid to be heated of the cooling medium heat exchanger 11 through the low pressure cooling medium vapor conduit 15. Therefore, the liquid cooling medium is put in an overcool state. Pressure of the overcool cooling medium is reduced by the expansion valve 14. Therefore, the temperature of the overcool cooling medium is lowered to the saturation temperature. When the cooling medium is cooled by the cooling medium heat exchanger 11, an amount of flash generated after it has passed through the expansion valve 14 is reduced, so that the result coefficient is enhanced. The cooling medium liquid of the saturation temperature is introduced into the evaporator 10 and scattered by the cooling medium scattering device 25 onto an external surface of the evaporation coil 10A installed in the evaporator 10.

The scattered cooling medium takes heat from the medium to be cooled which flows in the evaporation coil 10A. Therefore, the cooling medium evaporates from the surface of the evaporation coil 10A. The thus cooled medium to be cooled is used as a cool heat source for a refrigeration system. The evaporated cooling medium flows onto a side of the fluid to be heated of the cooling medium heat exchanger 11 through the low pressure cooling medium vapor conduit 15. The evaporated cooling medium exchanges heat with the cooling medium liquid here and is superheated. The superheated cooling medium vapor is introduced into the vapor-liquid mixer 22 and joined with the weak solution. Then the cooling medium vapor flows into the absorption regenerating device 3 together with the weak solution. A portion of the cooling medium vapor that has flowed into the absorption regenerating device 3 is absorbed by the weak solution that has flowed into the absorption regenerating device 3 together with the cooling medium vapor. However, another portion of the cooling medium vapor is not absorbed, but it flows out from the absorption regenerating 3 in the form of a two phase current. As described before, the cooling medium vapor that has flowed out from the absorption regenerating device 3 in the form of a two phase current is absorbed by the absorption liquid in the absorbing unit 8 so that a strong solution is made. This strong solution is stored in the bottom portion of the absorption unit 8, and the aforementioned operation cycle is repeated.

In the case of operation of the heat pump, that is, in the case of heating, the cooling mediums passing in the absorption radiator 6 and the condenser 9 are used as warm water for the air conditioning. In the case of cooling, the cooling mediums passing in the absorption radiator 6 and the condenser 9 are used as cooling water, and the heat is radiated to the outside air through an air heat exchanger. In the same manner, the fluid to be cooled flowing in the evaporation coil 10A is heated by the outside air in the air heat exchanger in the case of heating, however, it functions as cooling water in the case of cooling.

In this example, the condenser 9 and the evaporator 10 are formed into a shell and tube type, so that the heating medium flows in a tube. However, it is possible to arrange the condenser 9 and evaporator 10 to be air heat exchangers in which ammonia flows in tubes and fins are provided outside.

The cooing medium vapor sent into the condenser 9 is generated in the bottom portion of the regenerating device unit in which the regenerating input device 1 is arranged, and also generated on the external surfaces of the weak solution heat exchanger 2 and the absorption regenerating device 3. The generated cooling medium vapor passes on the external surface of the weak solution heat exchanger 2 from the bottom portion of the regenerating device unit 7 and also passes through the external surface of the absorption regenerating device 3 from the external surface of the weak solution heat exchanger 2. Due to the foregoing, the cooling medium vapor is rectified by the solution flowing on the external surfaces of the weak solution heat exchanger 2 and absorption regenerating device 3. Concentration of rising cooling medium vapor that has passed through the absorption regenerating device 3 becomes close to the equilibrium vapor composition. After that, the cooling medium is rectified by the circulating liquid in the rectifier 4B. A portion of vapor is condensed by the dephlegmator 4A, however, by the rectifying action conducted by the weak solution heat exchanger 2 and the absorption regenerating device 3, a dephlegmation load given to the dephlegmator 4A is reduced. In this case, the rectifier 4B may adopt a simple structure such as a Raschig ring filling layer.

Figure 10:
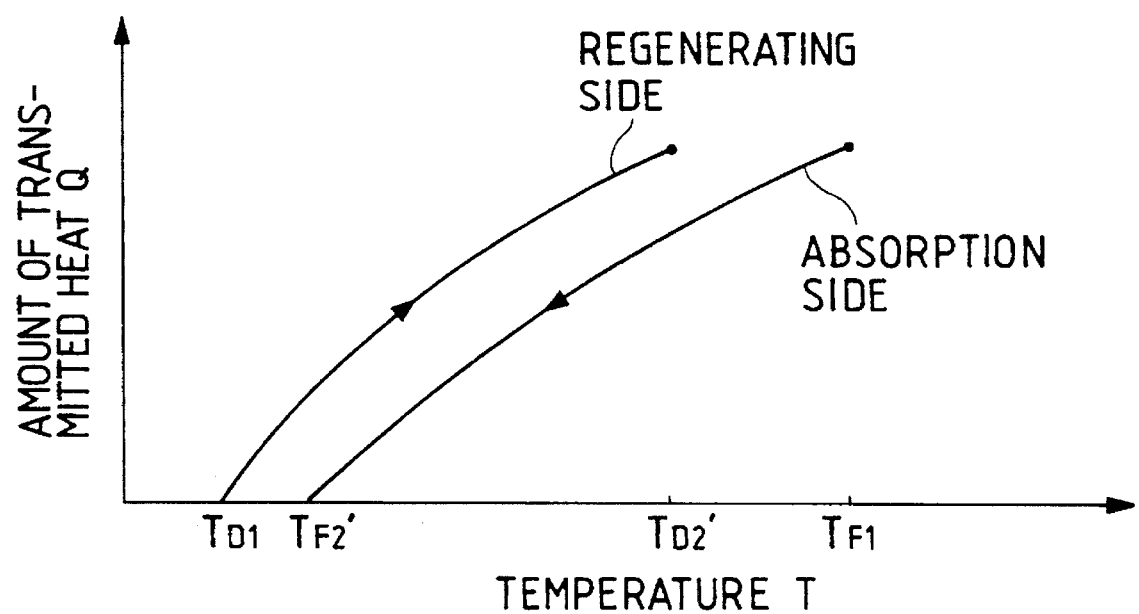
FIG. 10 is a temperature-heat transmission diagram in which transmission of absorption heat in the GAX cycle of the absorption type heat pump of the present invention is shown.
Figure 9:
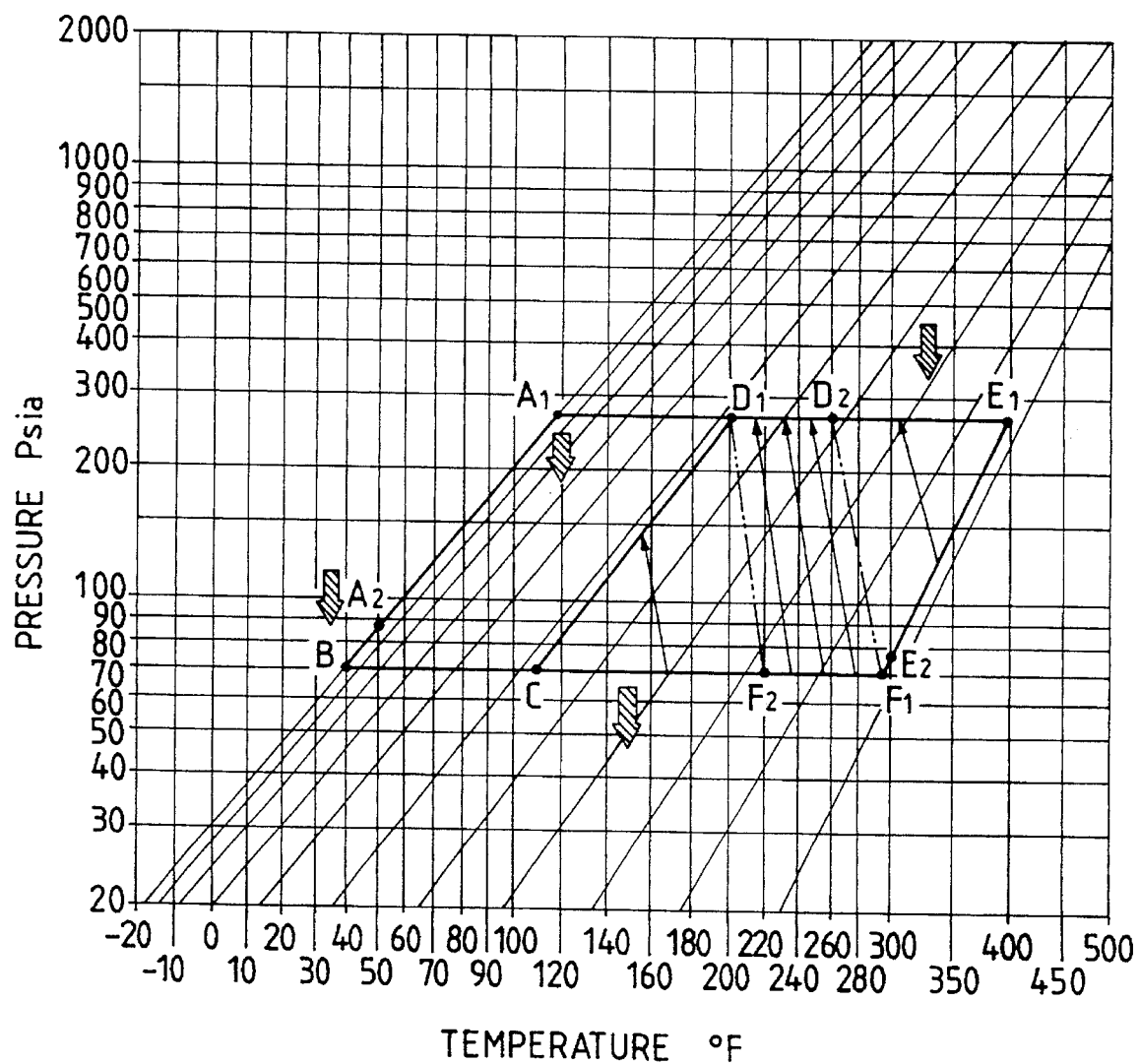
FIG. 9 is a diagram showing an example of the GAX cycle of absorption liquid.

FIG. 10 is a diagram showing a relation between the temperature and amount of transmitted heat in the absorption regenerating device of this example. In the diagram, it is shown that the temperature in the state $F_2$ of this example becomes close to the temperature of the state $D_1$.

According to this example, in the absorption regenerating device 3, the two phase current composed of the rising cooling medium generating absorption heat and the weak solution directly conducts heat exchange with the counterflow of the strong solution flowing down on its external surface. Therefore, the recovery ratio of absorption heat is enhanced and the result coefficient is increased, and further the entire apparatus is made to be compact. The entire regenerating unit is made to be a heat exchanger having the rectifying function since the regenerating unit is provided with a temperature and concentration distribution formed in the upward and downward direction and further the vapor and solution come into counterflow contact with each other. Accordingly, a dephlegmation load given to the dephlegmator is reduced and the result coefficient is enhanced, and further the rectifier is simplified.

In the above example, the absorption regenerating device 3 is composed in such a manner that the axis is arranged in the upward and downward direction and a spiral coil-shaped pipe line is arranged in the absorption regenerating device. However, the vertical type absorption regenerating device illustrated in FIG. 3 may be used.

Figure 3:
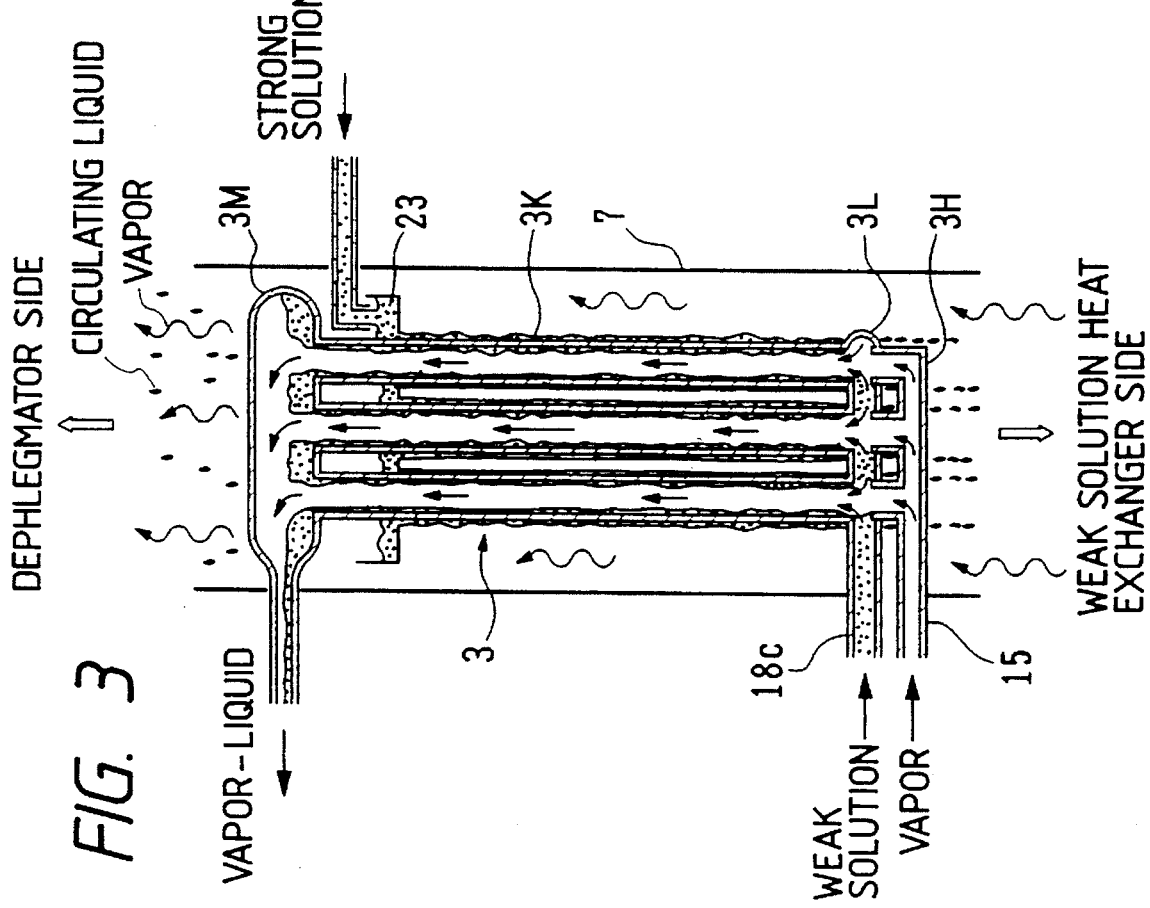
FIG. 3 is a sectional schematic illustration showing another model of the absorption regenerating device shown in FIG. 1.

The absorption regenerating device 3 shown in FIG. 3 includes: a tightly closed disk-shaped lower solution receiver 3L for storing a weak solution, the lower solution receiver 3L being located in a lower portion of the absorption regenerating device 3; a tightly closed disk-shaped upper solution receiver 3M located at an upper position of the lower solution receiver 3L; a plurality of rising pipes 3K connecting an upper surface of the lower solution receiver with a lower surface of the upper solution receiver; and cooling medium vapor blowing pipes 3N connected with the lower surface of the lower solution receiver, the cooling medium vapor blowing pipes 3N being located at the positions corresponding to the rising pipes, wherein the cooling medium vapor blowing pipes 3N are protruded upward from the lower surface by a predetermined length not exceeding the thickness of the lower solution receiver. The upper solution receiver is connected with the absorption device unit 8 through the two phase current conduit 18A. The lower solution receiver 3L is connected with the weak solution pressure reducing valve 19 through the weak solution conduit 18C. The cooling vapor blowing pipes 3N are connected with the outlet of the fluid to be heated of the cooling medium heat exchanger 11 through the low pressure cooling medium vapor conduit 15. In the case where this type absorption regenerating device is used, the vapor-liquid mixer is not used in which the cooling medium vapor and weak solution sent into the absorption regenerating device are previously mixed, and the cooling medium vapor and weak solution are separately sent into the absorption regenerating device.

Second embodiment

Figure 4:
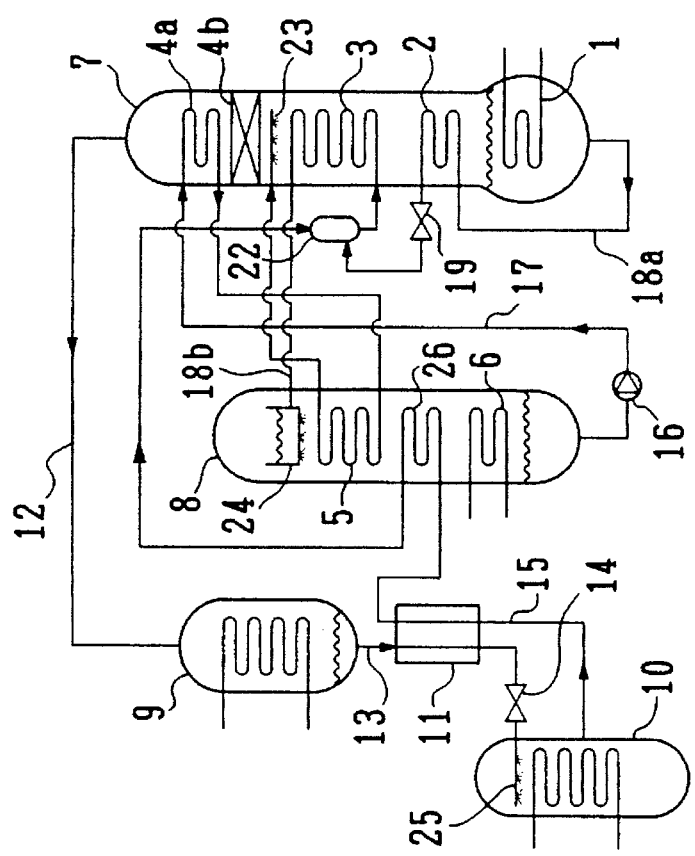
FIG. 4 is a system diagram showing a structure of the primary portion of the second example of the absorption type heat pump according to the present invention.

FIG. 4 is a system diagram showing the second example of the present invention. Different points of this example from the first example described above are described as follows: The cooling medium vapor heater 26 is arranged between the strong solution heat exchanger 5 and the absorption radiator 6 in the absorbing device unit 8. An outlet on the side of fluid to be heated of the cooling medium heat exchanger 11 is connected with an inlet of cooling medium vapor heater 26. An outlet of the cooling medium vapor heater 26 is connected with an inlet of the cooling medium vapor of the vapor-liquid mixer 22. The strong solution drips from the vapor-liquid separating solution scattering device 24. After the strong solution has flowed on an external surface of the strong solution heat exchanger 5, it drips onto an external surface of the cooling medium vapor heater 26. Then the strong solution flows down from the external surface of the cooling medium vapor heater 26 onto an external surface of the absorbing radiator 6. Other points of the structure are the same as those of the first example. Like reference characters are used to indicate like parts in FIGS. 1 and 4, and explanations are omitted here.

In order to enhance the result coefficient of the heat pump, it is necessary to use absorption heat for boiling (generation of cooling medium vapor) as much as possible. Accordingly, it is preferable that the temperature of a mixed current flowing in the absorption regenerating device 3 is high. In general, this temperature is determined by the concentration of the weak solution and the pressure of the evaporator. In the first example, cooling medium vapor mixed with the weak solution in the vapor-liquid mixer 22 is generated in the evaporator 10 and heated in the cooling medium heat exchanger 11. However, the temperature of the cooling medium is far lower than the temperature of the weak solution, and its enthalpy is low so that the weak solution is close to pure ammonia. Since this cooling medium vapor is mixed with the weak solution in the vapor-liquid mixer 22, the temperature of a mixed current flowing into the absorption regenerating device 3 is lowered.

The mixed current absorbs a portion of the cooling medium vapor into the weak solution while the mixed current is flowing in the absorption regenerating device 3. The mixed current is separated into a solution and cooling medium vapor by vapor-liquid separating solution scattering device 24, and then the solution is dripped on an external surface of the strong solution heat exchanger 5. While the solution flows down on the external surface of the strong solution heat exchanger 5, the solution is cooled by the strong solution flowing in the strong solution heat exchanger 5, so that the temperature of the solution is lowered. When the temperature of the solution is lowered, it is possible for the solution to further absorb cooling medium vapor, so that the cooling medium vapor separated by the vapor-liquid separating solution scattering device 24 starts to be absorbed by the solution. After the solution has absorbed cooling medium vapor, its ammonia concentration is increased, and the generated absorption heat is given to the strong solution flowing in the strong solution heat exchanger 5. Therefore, the temperature of the solution is lowered, and the solution flows down on the external surface of the cooling medium vapor heater 26. Since the absorption heat is received by the strong solution flowing in the strong solution heat exchanger 5, the temperature of the strong solution is raised.

After the solution has flowed down on the external surface of the cooling medium vapor heater 26, it is further cooled by cooling medium vapor which is generated in the evaporator 10 and flows into the cooling medium steam heater 26 through the cooling medium heat exchanger 11. While the solution is flowing on the external surface of the cooling medium vapor heater 26, it continues to absorb cooling medium vapor. When the solution absorbs ammonia vapor, the ammonia concentration is further increased and the temperature is lowered, and then the solution flows down onto the absorption radiator 6. Since the temperature of cooling medium vapor generated in the evaporator 10 is low, the cooling medium vapor is heated to a temperature a little lower than the condensation temperature by the cooling medium heat exchanger 11, and then the cooling medium vapor flows into the cooling medium vapor heater 26. The cooling medium vapor is given absorption heat here and heated to 70° to 80° C. and then introduced to the gas-vapor mixer 22. After the solution has flowed down onto the external surface of the absorption radiator 6, it is cooled by an outside cooling medium flowing in the absorption radiator 6, so that the residual vapor is absorbed. In this way, the solution becomes a strong solution and is stored in the bottom portion of the absorbing device unit 8.

In the second example of the present invention, the cooling medium vapor heater 26 is located at an intermediate position between the strong solution heat exchanger 5 and the absorbing radiator 6 in the upward and downward direction, and the solution successively drops downward. However, it is possible to arrange the strong solution heat exchanger 5 and the absorbing radiator in parallel. Due to the foregoing arrangement, the temperature of cooling medium vapor introduced into the vapor-liquid mixer 22 can be further increased.

According to the example described above, cooling medium vapor is heated by the cooling medium vapor heater 26 before it flows into the vapor-liquid mixer 22. Therefore, a drop of temperature of the weak solution in the vapor-liquid mixer 22 is reduced, and an amount of heat recovered by the absorption regenerating device 3 is increased, so that the result coefficient is enhanced. Since a portion of absorption heat to be removed outside by the absorbing radiator is recovered, a load of heat exchange of the absorbing radiator 6 is reduced. Therefore, it is possible to reduce an area of the absorbing radiator 6.

Third embodiment

Figure 5:
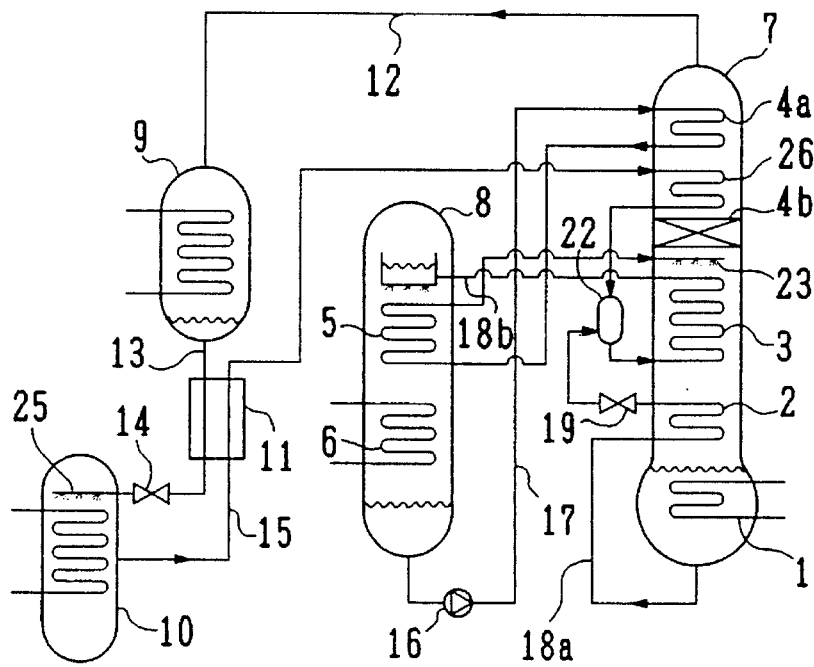
FIG. 5 is a system diagram showing a structure of the primary portion of the third example of the absorption type heat pump according to the present invention.

FIG. 5 is a system diagram showing the third example of the present invention. Different points of this example from the second example described above are explained as follows: The cooling medium vapor heater 26 is not arranged in the absorbing device unit 8, but it is arranged at an intermediate position between the dephlegmator 4A of the regenerating device unit 7 and the rectifier 4B. The cooling medium vapor heater 26 is composed in such a manner that high pressure cooling medium vapor passing through the rectifier 4B and rising in the regenerating device unit 7 successively passes through external surfaces of the cooling medium vapor heater 26 and the dephlegmator 4A. Like reference characters are used to indicate like parts in FIGS. 4 and 5, and explanations are omitted here.

High pressure cooling medium vapor is generated by the heating of the regenerating heat input device 1 arranged in the bottom portion of the regenerating device unit 7. Also, high pressure cooling medium vapor is generated on the external surfaces of the weak solution heat exchanger 2 and the absorbing regenerating device 3. When the thus generated high pressure cooling medium vapor passes through the rectifier 4B, it comes into contact with a circulating liquid dripping from an upper portion of the rectifier 4B, so that the high pressure cooling medium vapor is rectified, and the moisture in the vapor is reduced and the ammonia content is increased. After the high pressure cooling medium vapor has passed through the rectifier 4B, it successively passes on the external surfaces of the cooling medium vapor heater 26 and dephlegmator 4A. At this time, a portion of the high pressure cooling medium vapor is condensed and flows downward in the form of circulating liquid. Then the high pressure cooling medium vapor passes through the rectifier 4B, the external surface of the cooling medium vapor heater 26, and the external surface of the dephlegmator 4A. In this way, the cooling medium vapor is rectified, and the ammonia content is increased and the temperature is lowered. Then the high pressure cooling medium vapor passes through the high pressure cooling medium vapor conduit 12 and is guided into the condenser 9. The high pressure cooling medium vapor is completely condensed in the condenser 9 and changed into a liquid cooling medium.

Low pressure cooling medium vapor evaporated in the evaporator 10 at low temperature makes an heat exchange with the liquid cooling medium that has been condensed before. Therefore, the low pressure cooling medium vapor is heated to a temperature a little lower than the temperature of the condensed liquid (liquid cooling medium). After that, the low pressure cooling medium vapor flows into the cooling medium vapor heater 26. When the low pressure cooling medium vapor flows in the cooling medium vapor heater 26, it passes through the rectifier 4B and condenses a portion of the high pressure cooling medium vapor which is rising up. Due to the condensation heat, the temperature of the low pressure cooling medium vapor is further raised. The low pressure cooling medium vapor, the temperature of which is high, is mixed with the weak solution in the vapor-liquid mixer 22 and flows into the absorbing regenerating device 3. After that, the same operation as that of the example described before is carried out.

According to this example, after the low pressure vapor generated in the evaporator 10 has been heated by the cooling medium heat exchanger 11, it is further heated by the cooling medium vapor heater 26. Accordingly, the low pressure vapor gets into the vapor-liquid mixer 22 at high temperature. Therefore, a drop of temperature of the mixed current composed of the weak solution and cooling medium vapor is small. Due to the foregoing, an amount of recovered heat that has been recovered by the absorbing regenerating device 3 is increased, and the result coefficient is enhanced. Heat exchange of dephlegmation heat is also conducted by the cooling medium vapor heater 26. Therefore, it is possible to reduce an area of the heat exchanger of the dephlegmator 4A.

Figure 6A:
FIGS. 6 (a) to (c) are sectional views showing a model of the vapor-liquid two phase current.
Figure 6B:
Figure 6C:
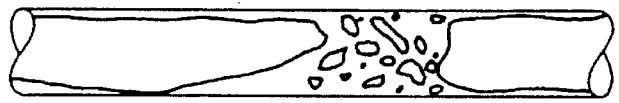
Figure 7:
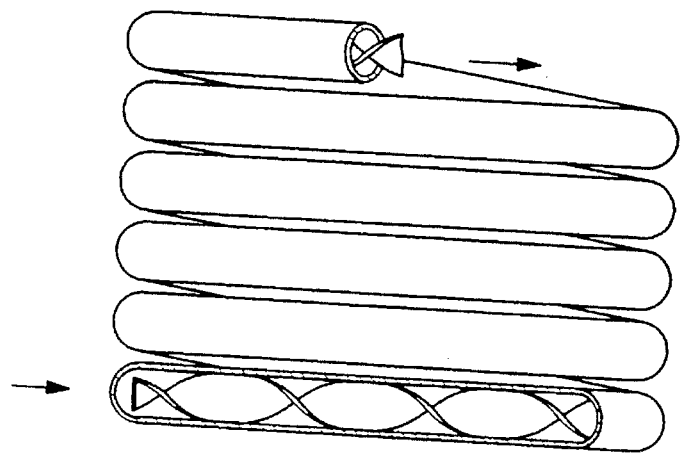
FIG. 7 is a side view showing an example in which a baffle plate is attached to the absorption regenerating device illustrated in FIG. 2.

Next, with reference to FIGS. 6, 7 and 8, the fourth example of the present invention will be explained as follows. In the examples described before, the spiral tube-shaped absorption regenerating device 3 is used. In the fourth example, the efficiency of this spiral tube-shaped absorption regenerating device 3 is enhanced. The weak solution and low pressure vapor flow in the absorption regenerating device 3 from the lower to upper portion. In the process of rising, the weak solution absorbs the cooling medium vapor. While the weak solution emits absorption heat, the ammonia concentration is increased. The absorption heat is used for boiling the strong solution flowing down on an external surface of the absorption regenerating device 3. In this case, the temperature of the weak solution flowing in the absorption regenerating device 3 is lowered.

In the case where heat exchange in the absorption regenerating device is directly conducted in the manner described in each example, in order to accomplish a counterflow heat exchange, it is necessary that the fluid flows from a lower to upper position on either the absorption side or the evaporation side. When the absorption regenerating device is formed into a spiral pipe shape and the inside of the pipe is used for absorption, since a volume of vapor is far larger than that of a solution (about 1:200), vapor and liquid are separated from each other so that the current becomes a wave-shaped current as shown in FIG. 6(a). When consideration is given to the heat transmission and absorption efficiencies, it is preferable that the fluid flows in a slag current as shown in FIG. 6(b) or a froth current shown in FIG. 6(c). In order to form the slag or froth current, it is necessary to reduce the pipe diameter so as to increase the flow speed. As a result, a large pressure loss is caused. In a conventional method, the occurrence of a wave-shaped current is prevented so as to improve the mixing of vapor and liquid. According to the method, in order to mix vapor with liquid uniformly, the spiral pipe is arranged horizontally. However, this method is disadvantageous as follows. When this method is applied to an absorption generating device in which heat exchange is directly made, it is difficult to conduct a counterflow heat exchange in which liquid flows down on an external surface of the spiral pipe by the gravity.

Fourth embodiment

Figure 8:
FIG. 8 is a fourth example side view showing an example of the baffle plate attached to the absorption regenerating device illustrated in FIG. 7.

In the fourth example of the present invention, in order to facilitate the mixing of vapor and liquid without causing a large pressure loss and enhance the heat transmission efficiency, a baffle plate twisted spirally as illustrated in FIG. 8 is inserted into the spiral pipe composing the absorption regenerating device. Other composing elements are the same as those each example described before. The baffle plate is inserted into a pipe before the pipe is bent into a spiral, that is, the baffle plate is inserted into a straight pipe. After the insertion of the baffle plate, the pipe is bent to be spiral-shaped.

According to the absorption regenerator having the above structure, the weak solution and low pressure vapor mixed in the vapor-liquid mixer 22 are guided from a lower portion of the absorption regenerator into the pipe and rise up in the pipe. At this time, the vapor and liquid rise up while they are being mixed by the baffle plate. The weak solution effectively absorbs a portion of cooling medium vapor so that the concentration is increased, and generated absorption heat is discharged outside of the absorption regenerating device, so that the temperature is lowered. Generated heat is given to the strong solution flowing down on an external surface of the pipe and utilized as evaporation heat for evaporating cooling medium vapor. By the baffle plate, a pressure loss in the absorption regenerating device is increased, however, the absorption and heat transmission efficiencies are improved, so that it is possible to shorten the pipe length, and even if the pipe diameter is increased, the baffle plate functions effectively. Accordingly, no problems are caused by the baffle plate. As a result, an amount of heat recovered by the absorption regenerating device is increased, and the result efficiency is enhanced, and further the absorption regenerating device is made to be compact.

Fifth embodiment

Figure 11:
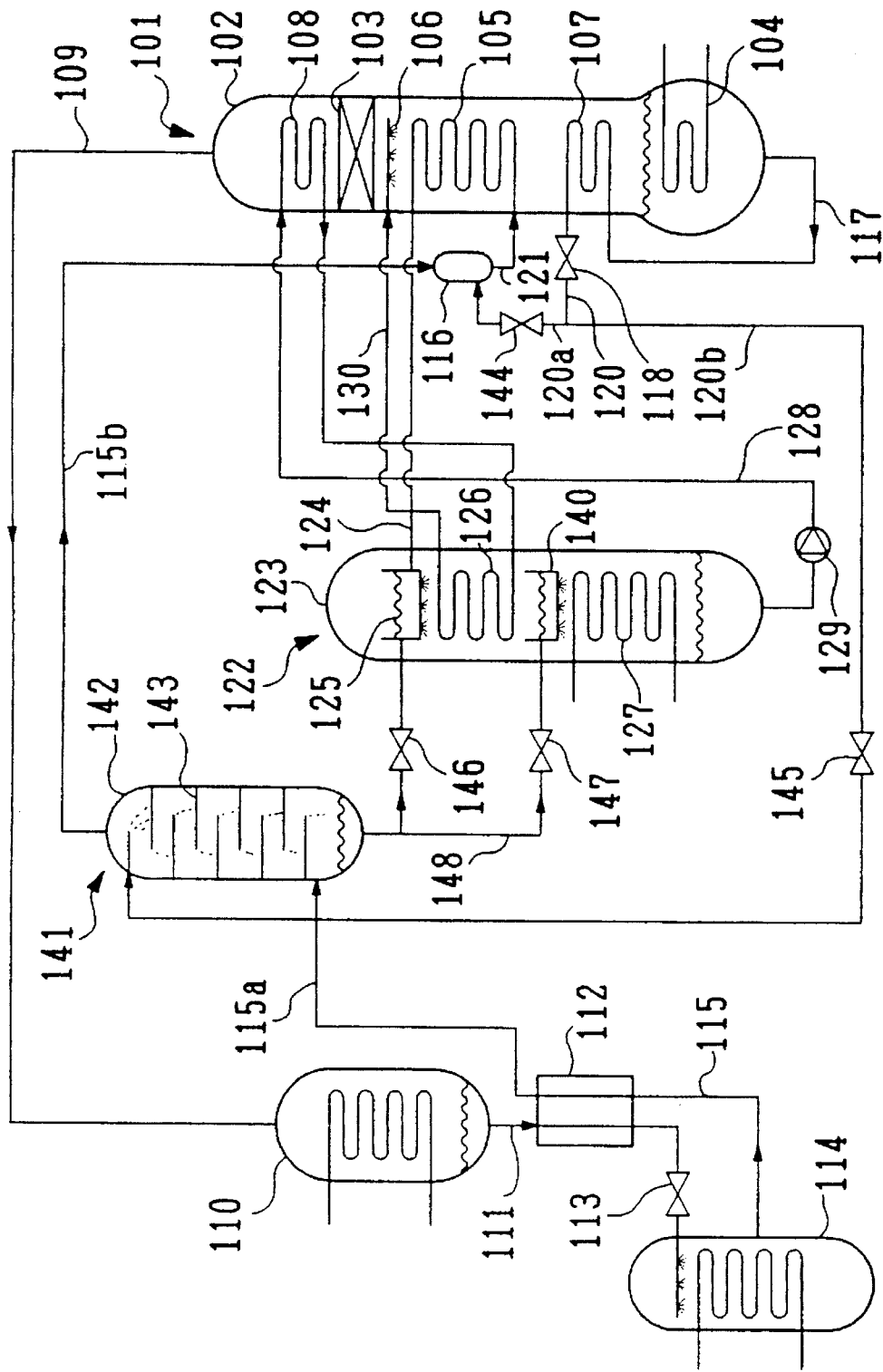
FIG. 11 is a system arrangement view of the absorption type heat pump of a fifth example of the present invention.

FIG. 11 is a system arrangement view of the absorption type heat pump of the fifth example of the present invention.

In the absorption type heat pump of the present invention illustrated in FIG. 11, low temperature cooling medium steam 115 of high purity is mixed with a high temperature weak solution 120 in the vapor-liquid mixer 116, and while absorption heat is being generated in accordance with the absorbing action, the mixture is introduced into an inside passage of the heat transfer wall of the absorption regeneration heat exchanging section 105. On the other hand, on an external surface of the heat transfer wall of the absorption regeneration heat exchanging section 105, a mixture flows down, and this mixture is composed of: a recirculating solution that has passed through the rectifying section 103 after a portion was condensed by the dephlegmator 108; and the strong solution 130 scattered by the strong solution scattering device 106. At this time, a mixed fluid flowing in an inside passage of the transfer heat wall of the absorption regeneration heat exchanging section 105 is heated by the generated absorption heat, so that it flows down while it is boiling.

In FIG. 11, a regeneration unit 101 is composed as follows. A strong solution in which the concentration of a cooling medium absorbed by an absorbent is high is introduced into a container of the regeneration unit 101, and the cooling medium vapor and the weak solution, the cooling medium concentration of which is low are separated from each other in the strong solution. A rectifying section 103 is arranged at an upper portion of the regeneration container 102. A regeneration heat input section 104 for heating a solution is arranged at a lower portion of the regeneration container 102. Due to the foregoing, a portion of heat necessary for regeneration is supplied from the outside of the system. Between the regeneration heat input section 104 and the rectifying section 103, there is provided an absorption regeneration heat exchanging section 105 having a heat exchanging passage partitioned off by a heat transmission wall. Above the absorption regeneration heat exchanging section 105, there is provided a strong solution scattering device 106. Between the absorption regeneration heat exchanging section 105 and the regeneration heat input section 104, there is provided a weak solution heat exchanging section 107 for heating and boiling a solution flowing down from the absorption regeneration heat exchanging section 105. Further, at a position close to the top of the regeneration container 102, there is provided a dephlegmator 108 for making a solution to be circulated to the rectifying section 103.

Cooling medium vapor 109 generated in this regeneration unit 101 is introduced into a condenser 110. In this condenser 110, the cooling medium vapor 109 is cooled by the cooling fluid introduced from the outside of the system so that the cooling medium vapor 109 is condensed and liquidized. The cooling medium 111 liquidized by the condenser 110 is introduced into an evaporator 114 through a cooling medium heat exchanger 112 and an expansion valve 113. In the evaporator 114, the cooling medium liquid is vaporized and the cooling medium vapor 115 is generated by the heat exchange with a heat medium supplied from the outside.

The generated cooling medium vapor 115 passes through the cooling medium heat exchanger 112, so that the cooling medium that has not been vaporized is evaporated and the temperature is raised, and the cooling medium vapor 115 becomes a cooling medium vapor 115a. Further, in an invert rectifier 141 described later, the cooling medium vapor 115a becomes a cooling medium vapor 115b, the steam component of which is increased, and the cooling medium vapor 115b is introduced into the vapor-liquid mixer 116. On the other hand, into the vapor-liquid mixer 116, a weak solution 120a distributed from a weak solution 120 is introduced, wherein the weak solution 120 is made when the temperature and pressure of the weak solution 117 gathered in the bottom of the regeneration unit are lowered through the weak solution heat exchange section 107 and the pressure reducing valve 118. Due to the foregoing, the weak solution 120a is mixed with the cooling medium vapor 115 in the vapor-liquid mixer 116. A mixed fluid (2 phase flow of vapor-liquid) that has flowed out from this vapor-liquid mixer 116 is introduced into a lower inlet of the absorption regeneration heat exchange section 105 of the regeneration unit 101 through a conduit 121.

The absorption unit 122 includes: a solution scattering device 125 provided in the absorption container 123, wherein a mixed fluid flowing out from an upper outlet of the absorption regeneration heat exchange section 105 of the regeneration unit 101 is introduced into the solution scattering device 125 through a conduit 124, and vapor and liquid are separated from each other and then scattered; a strong solution heat exchange section 126 in which the heat exchange passage partitioned by a heat transmission wail its arranged below the scattering device 125; an absorption radiating section 127 in which a heat exchange passage for passing a cooling fluid is arranged below the strong solution heat exchange section 126, wherein the heat exchange passage is partitioned by a heat transmission wall; and a solution scattering device 140 arranged above the absorption radiating section 127, the solution scattering device 140.

The strong solution gathered in the bottom portion of the absorption unit 122 is drawn out by the solution pump 129. Then the strong solution passes through the conduit 128 and the dephlegmator 108 arranged in the regeneration unit 101. After that, the strong solution is introduced into a lower inlet of the strong solution heat exchanging section 126 of the absorption unit 122. The strong solution that has flowed out from an upper outlet of this strong solution heat exchanging section 126 is supplied to the strong solution scattering device 106 of the regeneration unit 101.

In this case, portions relating to the invert rectifier will be explained as follows. The invert rectifier 141 includes a longitudinally long container 142 and a plurality of rectifying shelves 143 provided inside the container 142. The cooling medium vapor 115a supplied from the evaporator 114 through the cooling medium heat exchanger 112 is introduced into a lower portion of the container 142. The weak solution 120 that has flowed out from the regeneration unit and is introduced into the vapor-liquid mixer 116 through the pressure reducing valve 118 is divided into two currents. One current of the weak solution 120a is introduced into the vapor-liquid mixer 116 through the flow rate control means 144, and the other current of the weak solution 120a is introduced into an upper portion of the container of the invert rectifier 141 through the flow rate control means 145. A valve capable of adjusting the flow rate can be used for the flow rate control means 144, 145. Alternatively, after the flow rate and pressure loss in the pipe line have been determined in the design of the apparatus, instead of the above valve capable of adjusting the flow rate, an appropriate fixed flow rate control means (for example, an orifice or capillary) may be used. A top portion of the invert rectifier 141 is connected with the vapor-liquid mixer through the conduit, and a bottom portion of the invert rectifier is connected with either the solution scattering device 125 of the absorption unit 122 or the solution scattering device 140 arranged above the absorption radiating section 127.

The rectifying shelves 143 are composed in such a manner that a predetermined amount of solution stays on the shelves and a surplus amount of solution overflows onto the lower steps. For example, the rectifying shelves are composed in the following manner:

A plurality of holes are formed in a flat plate. Protruding portions are formed around the holes, so that a predetermined amount of solution stays on the shelves, and an amount of solution that has overflowed the protruding portions flows downward onto the lower shelves.

Operation of the example composed in the manner described above will be explained while the characteristics of the present invention are primarily explained.

The temperature of cooling medium vapor vaporized in the evaporator 114 is low and its purity is high. In the cooling medium vapor heat exchanger 112, the cooling medium that has not been evaporated is evaporated and the temperature is raised, so that the cooling medium vapor is changed into the cooling medium vapor 115a. This cooling medium vapor 115a is introduced into a lower portion of the invert rectifier 141 and rises inside it. On the other hand, the weak solution 120b of high temperature supplied from the regeneration unit 101 through the pressure reducing valve 118 and the flow rate control means 145 is introduced to an upper portion of the invert rectifier 141. The weak solution introduced into the invert rectifier 141 overflows a plurality of rectifying shelves and descends in the invert rectifier 141. In this process, the cooling medium vapor and the weak solution are subjected to vapor-liquid contact, and material exchange is conducted by an opposing flow of the cooling medium vapor and the weak solution.

Due to the above material exchange, the cooling medium vapor 115b of high temperature, the amount of the vapor component (steam) of absorbent of which is large, is generated at an upper portion of the invert rectifier 141. Therefore, the enthalpy of cooling medium vapor is greatly increased. This cooling medium vapor 115a of high enthalpy is supplied to the vapor-liquid mixer 116. Due to the foregoing, even when the cooling medium 115a is mixed with the weak solution 120a in the vapor-liquid mixer 116, the temperature is seldom lowered.

Accordingly, the temperature of mixed fluid which is a heating fluid of the absorption regeneration heat exchanging section 105 of the regeneration unit 101 can be maintained high. Accordingly, an amount of heat exchange is increased and the result coefficient can be enhanced. In this connection, according to the material exchange conducted in the invert rectifier 141, the purity of cooling medium of vapor is lowered. Therefore, this operation is referred to as invert rectification.

On the other hand, the weak solution flowing down in the invert rectifier 141 is subjected to vapor-liquid contact with cooling vapor. Therefore, the weak solution becomes an intermediate weak solution 148 of low temperature, the cooling medium concentration of which is high. This intermediate weak solution 148 is supplied to the solution scattering device 125 arranged above the strong solution heat exchanging section 126 of the absorption unit 122 or supplied to the solution scattering device 140 arranged above the absorption radiator 127. In this way, the intermediate weak solution 148 is subjected to absorption treatment. It is a matter of design to determine to which scattering device the intermediate weak solution 48 is supplied. The essential point is described as follows:

When the temperature of the intermediate weak solution 148 provided by the invert rectifier 141 is substantially the same as the temperature of the weak solution 124 supplied to the solution scattering device 125, the intermediate weak solution 148 is supplied to that solution scattering device 125. When the temperature of the intermediate weak solution 148 is lower than the temperature of the weak solution 124, the intermediate weak solution 148 is supplied to that solution scattering device 140. In other words, after the design condition of the apparatus has been determined, one of the conduits corresponding to the opening and closing valve 146 or 147 may be provided. In the case where the intermediate weak solution 148 is supplied to the solution scattering device 125, it is not necessary to install the solution scattering device 140.

The temperature of the intermediate weak solution 148 provided by the invert rectifier 141 varies in accordance with the performance of the invert rectifier 141 and the ratio (flow dividing ratio=120*b*/120) of the weak solution introduced into the vapor-liquid mixer 116 and the invert rectifier 141. This flow dividing ratio is determined to be an appropriate value from the viewpoint of designing and set by the flow rate control means 144, 145.

For example, when the flow dividing ratio is reduced, the temperature of the intermediate weak solution 148 is lowered. The temperature of the cooling medium vapor 115*b* supplied from the invert rectifier 141 to the vapor-liquid mixer 116 is also low, and further an amount of moisture in vapor is not increased. Accordingly, the temperature of mixed fluid supplied from the vapor-liquid mixer 116 to the absorption regeneration heat exchanging section 105 is also lowered. Therefore, an amount of exchanged heat that can be recovered is not increased.

On the other hand, when the flow dividing ratio is increased, the temperature of the intermediate weak solution 148 is not so lowered, however, the temperature of the cooling medium vapor 115*b* supplied to the vapor-liquid mixer 116 and the concentration of the vapor component of absorbent are enhanced, so that the enthalpy can be increased. Consequently, it is possible to increase an amount of heat exchange conducted in the absorption regeneration heat exchanging section.

For example, it is possible to eliminate the vapor-liquid mixer 116 and to introduce all weak solution 117 into the invert rectifier 141. In this case, all fluid introduced from the vapor-liquid mixer 116 into the absorption regeneration heat exchanging section 105 becomes vapor. In this case, inside of the heat exchanging passage in the absorption regeneration heat exchanging section 105, the introduced vapor is condensed and liquidized by the heat exchange conducted with a solution flowing down on the outer surface. Even in this case, it is possible to secure a large amount of heat exchange in the absorption regeneration heat exchanging section. In this connection, absorption and condensation of vapor conducted in the absorption regeneration heat exchanging section 105 changes in the equilibrium condition of vapor and liquid, so that it is accompanied by a continuous temperature change.

It is possible to conduct the same invert rectifying operation when the filling material, the surface area per unit volume of which is large, is applied to the filling layer instead of the rectifying shelves 141.

According to the present invention, it is possible to increase an amount of heat generated in the absorption cycle and used for the regenerating cycle. Therefore, it is possible to enhance a result coefficient of the absorption type heat pump in which the GAX cycle is used.

As explained above, according to the present invention, an invert rectifier is provided, and a portion of the weak solution or all the weak solution is made to flow in the invert rectifier, and cooling medium vapor introduced into the vapor-liquid mixer is subjected to vapor-liquid contact with the weak solution in the invert rectifier. Due to the foregoing, it is possible to increase the temperature and enthalpy of the mixed fluid of the weak solution and the cooing medium supplied to the absorption regeneration heat exchanging section directly or through the vapor-liquid mixer. Consequently, it is possible to increase an amount of heat exchange in the absorption regeneration heat exchanging section, and the result coefficient can be enhanced.

What is claimed is:

1. An absorption type heat pump comprising:
   a regeneration unit including:
     a rectifying section for enhancing the concentration of a generated cooling medium,
     a regeneration heat input device for heating and boiling a solution that has flowed from the rectifying section, the regeneration heat input device being arranged under the rectifying section,
     an absorption regeneration heat exchanging section arranged between the regeneration heat input device and the rectifying section, the absorption regeneration heat exchanging section having a heat exchanging passage composed of heat transfer walls, and
     a strong solution scattering device arranged between the absorption regeneration heat exchanging section and the rectifying section;
   a condenser into which steam of cooling medium generated in the regeneration unit is introduced for cooling, condensing and liquidizing the cooling medium steam;
   an evaporator into which the condensed and liquidized cooling medium liquid is introduced from the condenser through an expansion valve so as to evaporate the cooling medium liquid by heat exchange with a heating medium;
   a vapor-liquid mixer for mixing the supplied cooling medium steam with a portion of the weak solution that has flowed out from the regeneration unit;
   a first conduit for introducing the mixed liquid that has flowed out from the vapor-liquid mixer into a lower inlet of an absorption regeneration heat exchanging section of the regeneration unit;
   an absorption unit including:
     a first solution scattering device for introducing and scattering a mixed fluid that has flowed out from an upper outlet of the absorption regeneration heat exchanging section of the regeneration unit
     a strong solution heat exchanging section having a heat exchange passage composed of heat transfer walls, the strong solution heat exchanging section being arranged under the solution scattering device; and
     an absorption radiating section having a heat exchanging passage in which a cooling fluid flows, the absorption radiating section being provided under the strong solution heat exchanging section and composed of heat transfer walls;
   a solution pump for drawing a strong solution stored in a bottom portion of the absorption unit;
   a second conduit for introducing the strong solution drawn out by the solution pump into a lower inlet of the strong solution heat exchanging section of the absorption unit;
   a third conduit for supplying a strong solution flowing out from an upper outlet of the strong solution heat exchanging section of the absorption unit to the strong solution scattering device of the regeneration unit;

an invert rectifier for introducing cooling medium steam flowing out from the evaporator to a lower portion of the container and also for introducing a residual portion of the weak solution that has flowed out from the regeneration unit and is introduced into the vapor-liquid mixer, so that the cooling medium steam and the weak solution are subjected to vapor-liquid contact;

a forth conduit for supplying cooling medium steam generated at the top of this invert rectifier to the vapor-liquid mixer; and a fifth conduit for supplying an intermediate weak solution generated at the bottom portion of the invert rectifier to the solution scattering device of the absorption unit.

2. The absorption type heat pump according to claim 1, wherein the absorption unit includes a second solution scattering device arranged between the absorption radiating section and the strong solution heat exchanging section; and further comprising:

a sixth conduit for supplying an intermediate weak solution generated at the bottom portion of the invert rectifier to the second solution scattering device of the absorption unit.

3. The absorption type heat pump according to claim 1, wherein a ratio of the weak solution introduced into the vapor-liquid mixer to the weak solution introduced into the invert rectifier after the weak solution has flowed out from the regeneration unit is maintained to be in a range from 20% to 100%.

4. The absorption type heat pump according to claim 2, wherein a ratio of the weak solution introduced into the vapor-liquid mixer to the weak solution introduced into the invert rectifier after the weak solution has flowed out from the regeneration unit is maintained to be in a range from 20% to 100%.

5. The absorption type heat pump according to claim 1, wherein the invert rectifier includes a plurality of shelves provided inside the container.

6. The absorption type heat pump according to claim 2, wherein the invert rectifier includes a plurality of shelves provided inside the container.

7. The absorption type heat pump according to claim 3, wherein the invert rectifier includes a plurality of shelves provided inside the container.

8. The absorption type heat pump according to claim 4, wherein the invert rectifier includes a plurality of shelves provided inside the container.

9. The absorption type heat pump according to claim 1, wherein the invert rectifier includes a filling layer in which filling material having a predetermined surface area per unit volume is filled up.

10. The absorption type heat pump according to claim 2, wherein the invert rectifier includes a filling layer in which filling material having a predetermined surface area per unit volume is filled up.

11. The absorption type heat pump according to claim 3, wherein the invert rectifier includes a filling layer in which filling material having a predetermined surface area per unit volume is filled up.

12. The absorption type heat pump according to claim 4, wherein the invert rectifier includes a filling layer in which filling material having a predetermined surface area per unit volume is filled up.

13. The absorption type heat pump according to claim 5, wherein the invert rectifier includes a filling layer in which filling material having a predetermined surface area per unit volume is filled up.

14. The absorption type heat pump according to claim 6, wherein the invert rectifier includes a filling layer in which filling material having a predetermined surface area per unit volume is filled up.

15. The absorption type heat pump according to claim 7, wherein the invert rectifier includes a filling layer in which filling material having a predetermined surface area per unit volume is filled up.

16. The absorption type heat pump according to claim 8, wherein the invert rectifier includes a filling layer in which filling material having a predetermined surface area per unit volume is filled up.

17. An absorption type heat pump comprising:

a regeneration unit including:
a regeneration heat input device for heating and boiling a solution, into which a strong solution, in which the concentration of a cooling medium absorbed by an absorbent is high, is introduced, the regeneration heat input device being arranged under a rectifying section;
an absorption regeneration heat exchanging section arranged between the regeneration heat input device and the rectifying section, the absorption regeneration heat exchanging section having a heat exchanging passage composed of heat transfer walls; and
a strong solution scattering device arranged between the absorption regeneration heat exchanging section and the rectifying section;

a condenser into which steam of cooling medium generated in the regeneration unit is introduced for cooling, condensing and liquidizing the cooling medium steam;

an evaporator into which the condensed and liquidized cooling medium liquid is introduced from the condenser through an expansion valve so as to evaporate the cooling medium liquid by heat exchange with a heating medium;

an absorption unit including a solution scattering device for introducing and scattering a mixed fluid that has flowed out from an upper outlet of the absorption regeneration heat exchanging section of the regeneration unit, a strong solution heat exchanging section having a heat exchange passage composed of heat transfer walls, the strong solution heat exchanging section being arranged under the solution scattering device, and an absorption radiating section having a heat exchanging passage in which a cooling fluid flows, the absorption radiating section being provided under the strong solution heat exchanging section and composed of heat transfer walls;

a solution pump for drawing a strong solution stored in a bottom portion of the absorption unit;

a first conduit for introducing the strong solution drawn out by the solution pump into a lower inlet of the strong solution heat exchanging section of the absorption unit;

a second conduit for supplying a strong solution flowing out from an upper outlet of the strong solution heat exchanging section of the absorption unit to the strong solution scattering device of the regeneration unit;

an invert rectifier for introducing cooling medium steam flowing out from the evaporator to a lower portion of the container and also for introducing a residual portion of the weak solution that has flowed out from the regeneration unit and is introduced into the vapor-liquid mixer, so that the cooling medium steam and the weak solution are subjected to vapor-liquid contact;

a third conduit for supplying cooling medium steam generated at the top of this invert rectifier to a lower inlet of the absorption regeneration heat exchanging section of the regeneration unit; and a fourth conduit for supplying an intermediate weak solution generated at the bottom portion of the invert rectifier to the solution scattering device of the absorption unit.

18. The absorption type heat pump according to claim 17, wherein the invert rectifier includes a plurality of shelves provided inside the container.

19. The absorption type heat pump according to claim 17, wherein the invert rectifier includes a filling layer in which filling material having a predetermined surface area per unit volume is filled up.

20. The absorption type heat pump according to claim 18, wherein the invert rectifier includes a filling layer in which filling material having a predetermined surface area per unit volume is filled up.

21. An absorption type heat pump comprising:

a regenerating device unit having a dephlegmator and a rectifier arranged below the dephlegmator, said regenerating unit heating a solution in the bottom by an external heating means to vaporize a cooling medium;

a condenser connected with said regenerating device unit through a high pressure cooling medium vapor conduit, said condenser condensing and liquidizing cooling medium vapor introduced from said regenerating device unit;

a cooling medium heat exchanger connected with said condenser through a cooling medium conduit, said cooling medium heat exchanger cooling the condensed and liquidized cooling medium;

a cooling medium expansion valve for decompressing the liquidized cooling medium cooled by said cooling medium heat exchanger;

an evaporator for evaporating the liquid cooling medium decompressed by the cooling medium expansion valve on the external surface of an evaporating coil, so that the external cooling medium in the evaporating coil is cooled and supplied to a thermal load to be cooled;

a low pressure cooling medium vapor conduit for guiding the cooling medium vapor generated in the evaporator to an absorption unit through a heated fluid side of said cooling medium heat exchanger;

a solution pump connected with a bottom of the absorbing device unit, said solution pump compressing a strong solution stored in the bottom so as to feed the strong solution to a strong solution heat exchanger arranged in said absorbing device unit;

a strong solution scattering means for scattering a strong solution that has passed through a strong solution heat exchanger, said strong solution scattering means being arranged in said regenerating device unit;

a weak solution heat exchanger arranged below the strong solution scattering means of the regenerating device unit, said weak solution heat exchanger reducing a temperature of the weak solution when the weak solution in the bottom of the regenerating device unit passes through said weak solution heat exchanger for heat exchange with the strong solution;

a weak solution introducing means for supplying a weak solution that has passed through the weak solution heat exchanger to the absorbing device unit through a weak solution pressure reducing valve; and an absorbing radiator arranged in the absorbing device unit, said absorbing radiator removing the absorption heat generated when the strong solution is produced when the weak solution supplied by the weak solution introducing means absorbs the cooling medium vapor supplied through the low pressure cooling medium vapor conduit, wherein ammonia is used as a cooling medium and water is used as an absorbent, a vapor-liquid mixer is connected onto a downstream side of the weak solution pressure reducing valve, a downstream end of the low pressure cooling medium vapor conduit is connected with another entrance of the vapor-liquid mixer, a pipe line forming the absorption regenerating device through which a mixed current of two phases of vapor-liquid passes is arranged under the strong solution scattering means of the regenerating device unit, and an inlet of the pipe line is connected with an outlet of the vapor-liquid mixer, and an outlet of the pipe line is connected with the absorbing device unit through a conduit of the two phase current.

22. The absorption type heat pump according to claim 21, wherein the absorption regenerating device is composed of a spiral-coil-shaped pipe line, the central axis of which is arranged vertically.

23. The absorption type heat pump according to claim 21, wherein said absorption regenerating device includes:

a tightly closed disk-shaped lower solution receiver arranged in a lower portion of the absorption regenerating device, said solution receiver storing a weak solution;

a tightly closed disk-shaped upper solution receiver arranged in an upper portion of the lower solution receiver;

a plurality of rising pipe for vertically communicating an upper surface of the lower solution receiver with a lower surface of the upper solution receiver;

a cooling medium vapor blowing pipe arranged at a position corresponding to said rising pipe on a lower surface of the lower solution receiver, said cooling medium vapor blowing pipe protruding upward from the lower surface by a predetermined distance not exceeding the thickness of the lower solution receiver, wherein said upper solution receiver is connected with the absorbing device unit through a conduit of two phase current, said lower solution receiver is connected with the weak solution pressure reducing valve through a weak solution conduit, and said cooling medium vapor blowing pipe is connected with an outlet for heated fluid of the cooling medium heat exchanger through said low pressure cooling medium vapor conduit.

24. The absorption type heat pump according to claim 21, wherein the dephlegmator, rectifier, strong solution scattering means, absorption regenerating device and weak solution heat exchanger are arranged from above to below in this order, and a solution that has dripped from an upper portion of each unit flows on the external surface of the unit and drips onto the external surface of a unit located below.

25. The absorption type heat pump according to claim 21, wherein a cooling medium vapor heater having a pipe line in which cooling medium vapor passes is arranged at a position where the solution drips from the external surface of the dephlegmator and the position is located in the middle between the dephlegmator provided in the regenerating device unit and the rectifier with respect to the vertically direction, and an inlet of cooling medium vapor of the cooling medium vapor heater is connected with an outlet of heated fluid of the cooling medium heat exchanger, and an outlet of cooling medium vapor is connected with an inlet of cooling medium vapor of the vapor-liquid mixer.

26. The absorption type heat pump according to claim 21, wherein a ribbon-shaped baffle plate twisted around the axial line is fixed inside of the pipe line composing the absorption regenerating device.

* * * * *